United States Patent
Gamble, Jr. et al.

(10) Patent No.: US 11,864,154 B2
(45) Date of Patent: Jan. 2, 2024

(54) CROWDSOURCED BUILDING STRUCTURE DETECTION WITH SYNTHETIC DATA GENERATION

(71) Applicant: Verizon Patent and Licensing Inc., Basking Ridge, NJ (US)

(72) Inventors: Jerry Gamble, Jr., Grapevine, TX (US); Corbin Pierce Moline, Clermont, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 374 days.

(21) Appl. No.: 17/160,502

(22) Filed: Jan. 28, 2021

(65) Prior Publication Data

US 2022/0240217 A1 Jul. 28, 2022

(51) Int. Cl.
  H04W 64/00 (2009.01)
  H04W 4/029 (2018.01)
  G06F 18/23 (2023.01)
  G06F 18/214 (2023.01)

(52) U.S. Cl.
  CPC ...... *H04W 64/006* (2013.01); *G06F 18/2148* (2023.01); *G06F 18/23* (2023.01); *H04W 4/029* (2018.02); *H04W 64/003* (2013.01)

(58) Field of Classification Search
  CPC . H04W 64/006; H04W 4/029; H04W 64/003; G06F 18/2148; G06F 18/23
  USPC ................................................... 455/456.1
  See application file for complete search history.

(56) References Cited

U.S. PATENT DOCUMENTS

| 10,779,135 | B1  |   | 9/2020 | Monga et al. |
| 2011/0087431 | A1 | * | 4/2011 | Gupta ............... G01S 5/017 701/408 |
| 2014/0274151 | A1 | * | 9/2014 | Pattabiraman ........ H04B 7/12 455/456.3 |
| 2015/0308842 | A1 | * | 10/2015 | Meredith ............. H04W 4/021 701/410 |

OTHER PUBLICATIONS

Chandra, et al., "Speed Distribution Curves for Pedestrians During Walking and Crossing", Procedia—Social and Behavioral Sciences 104 (2013) 660-667, www.sciencedirect.com.
Bhatia, et al., "A Better Bound on the Variance", Apr. 2000, pp. 353-357, The Mathematical Association of America, American Mathematical Monthly.
Choi, et al., "Individual stair ascent and descent walk speeds measured in a Korean high-rise building", 2013, Fire Technology, 50, 267-295, 2014.
Odenwald, Dr. Sten, "A Guide to Smartphone Sensors", NASA Space Science Education Consortium, May 2019, 209 pages.

\* cited by examiner

Primary Examiner — Michael R Neff (57) ABSTRACT

One or more computing devices, systems, and/or methods for synthetic data point generation are provided. In an example, error bounds for generating synthetic data points from a set of data points collected from mobile devices may be determined. Paths associated with groups of data points of the set of data points may be determined. Error bounds may be applied to limit the paths to generate limited path data. Synthetic data points may be generated based upon the limited path data.

20 Claims, 10 Drawing Sheets

CROWDSOURCED BUILDING STRUCTURE DETECTION WITH SYNTHETIC DATA GENERATION

BACKGROUND

Machine learning algorithms may implement various functionality for performing tasks. For example, a machine learning algorithm may utilize a clustering algorithm to group data points. Data points that are grouped into the same group should have similar properties and features, while data points in different groups should have dissimilar properties and features. The machine learning algorithm may be utilized to preform various types of tasks, such as identifying similar users, identifying spam emails, identifying fake news, identifying building characteristics of buildings such as floor height, etc.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION OF EXAMPLE EMBODIMENTS

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of computing scenarios in which the disclosed subject matter may be utilized and/or implemented.

One or more systems and/or techniques for synthetic data point generation are provided. Mobile devices (e.g., a smart watch, a wearable device, a phone, a tablet, a laptop, or any other type of computing device) may comprise sensors that can capture various types of sensor data as data points. For example, a mobile device may comprise an accelerometer, a barometer, a microphone, a camera, a gyroscope, a global positioning system (GPS) unit, and/or other types of sensors. These sensors may collect motion data of the mobile device, pressure data indicative of elevation, sound, imagery, GPS data, and/or other types of sensor data.

The sensor data may be utilized for various purposes. In an example, a user may provide a service with access to location and motion data of a mobile device for the purpose of routing the user to points of interest, providing notifications of nearby points of interest, identifying the structure of buildings within which the user is moving, etc. For example, a software developer kit (SDK) built into a mobile operating system of the mobile device may detect when a particular amount of change in location occurs (e.g., a change in location indicative of user movement). In response to detecting the change in location, data may be collected from various sensors over a period of time. Personally identifiable information may be stripped from the collected data to create data points that may be transmitted from the mobile device to the service. In this way, the service may receive data points from various mobile devices associated with users that provided the service with access to such data points so that the service can utilize the data points to implement various functionality based upon the data points. It may be appreciated that a wide variety of services may implement various functionality utilizing data points, such as spam detection, building structure detection, classifying users, providing recommendation to users, routing users, etc. The services may execute machine learning algorithms, models, clustering algorithms, and/or other functionality to process the data points in order to implement such functionality.

The services may crowdsource data points from multiple mobile devices in order to improve accuracy. For example, a building survey service may be able to more accurately determine a structure of a building, such as detecting floor levels and heights, if the building survey service is able to acquire more sensor data from more mobile devices moving around within the building. Unfortunately, the ability and accuracy of a service to implement functionality derived from data points collected from mobile devices may be inhibited by sparsity of the data points. This sparsity can arise due to the limited number of mobile devices engaging in the collection of sensor data that is provided to the service, along with other factors such as mobile device power draw concerns that limit the frequency of data collection from sensors and limit the amount of transmission bandwidth used to transmit the data points over a network to the service.

Accordingly, as provided herein, a compensation mechanism is provided to generate synthetic data points in order to compensate for sparsity of data points available to services for performing various types of functionality. This compensation mechanism converts crowdsourced data points (e.g., data points collected from a plurality of mobile devices) into vectors using probabilistic inference. Synthetic data points may be generated from the vectors. In this way, the synthetic data points may alleviate data sparsity issues, thus improving the ability and accuracy of services to utilize not only the crowdsource data points but also the synthetic data points to perform various functionality, such as determining a structure of a building (e.g., floor level and height detection, detection of an elevator or escalator, wall detection, etc.) and/or a wide variety of other functionality that may process data points utilizing machine learning algorithms, clustering algorithms, etc.

Figure 1:
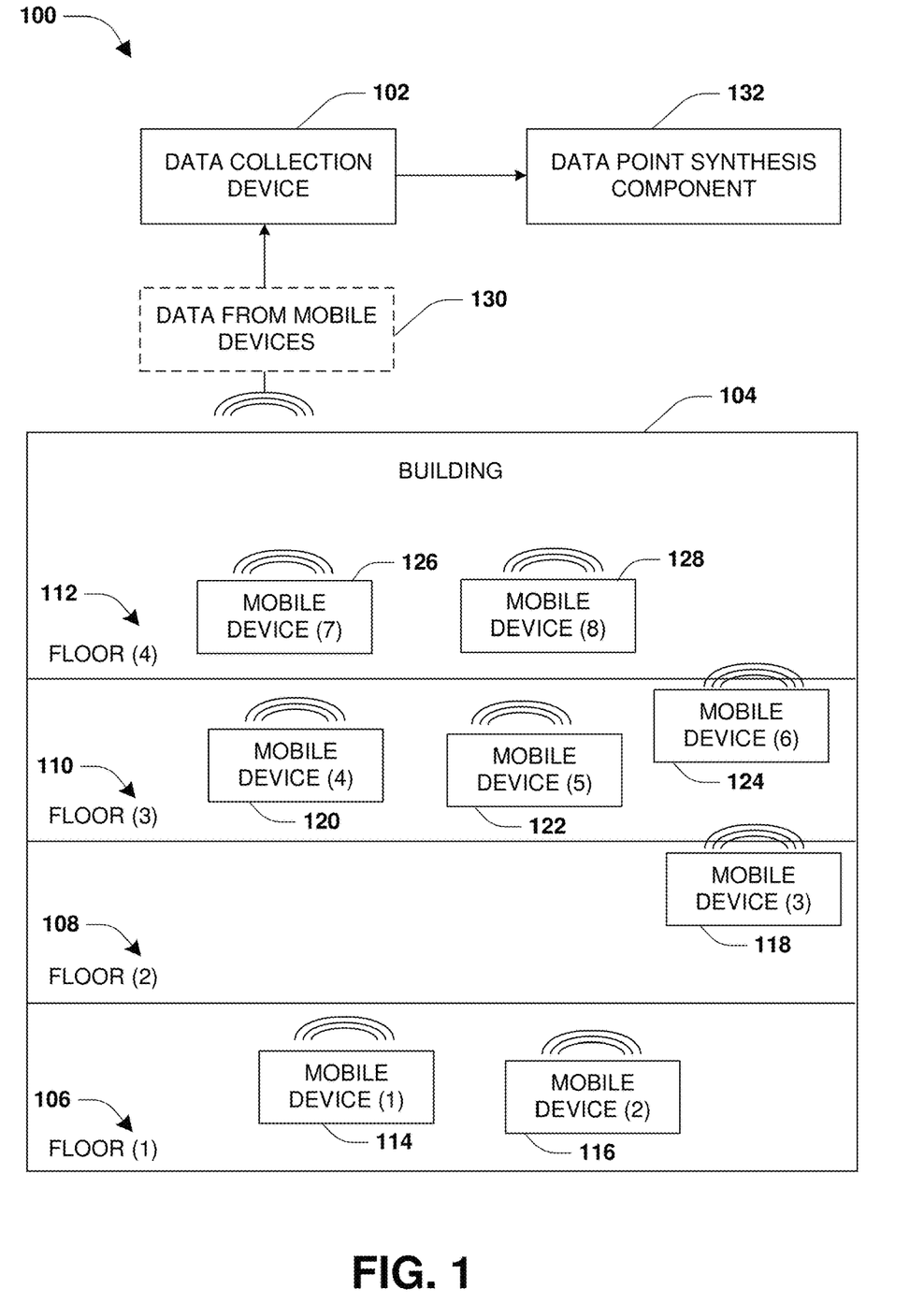
FIG. 1 is a diagram illustrating an example scenario associated with synthetic data point generation.
Figure 2:
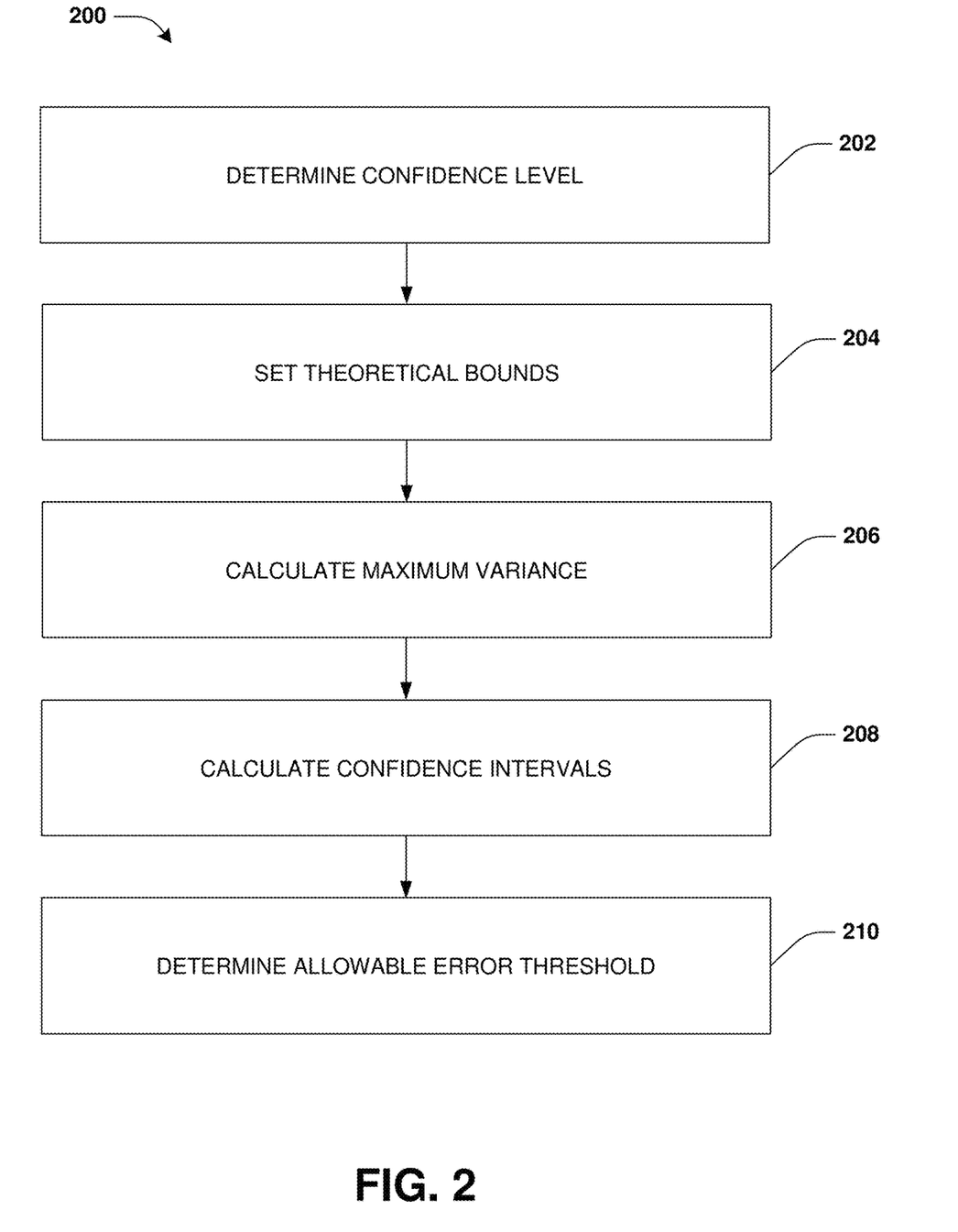
FIG. 2 is a flow chart illustrating an example method for determining an allowable error threshold used for synthetic data point generation.
Figure 3:
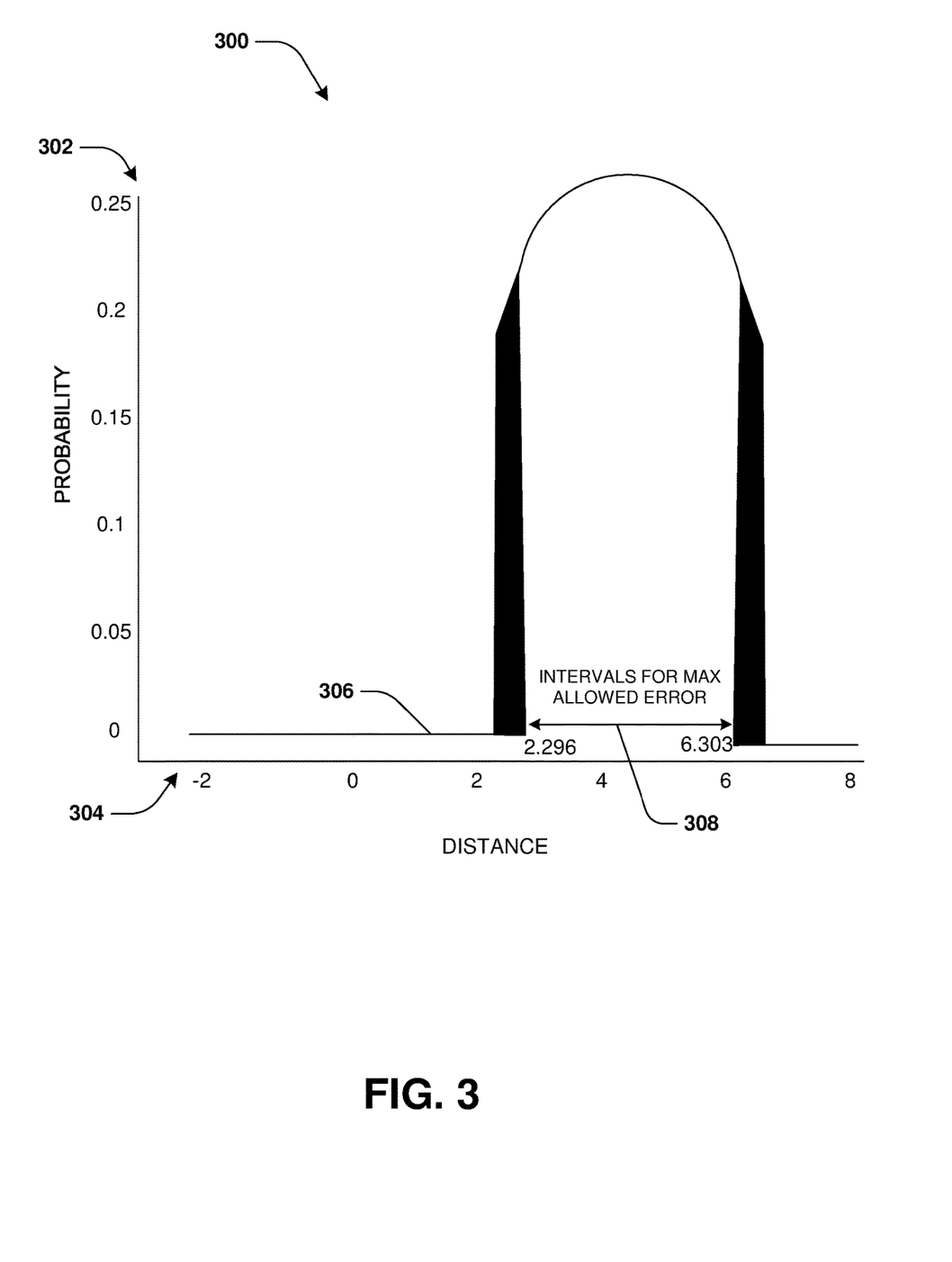
FIG. 3 is an illustration of an example graph illustrating confidence intervals for an allowable error threshold.
Figure 4:
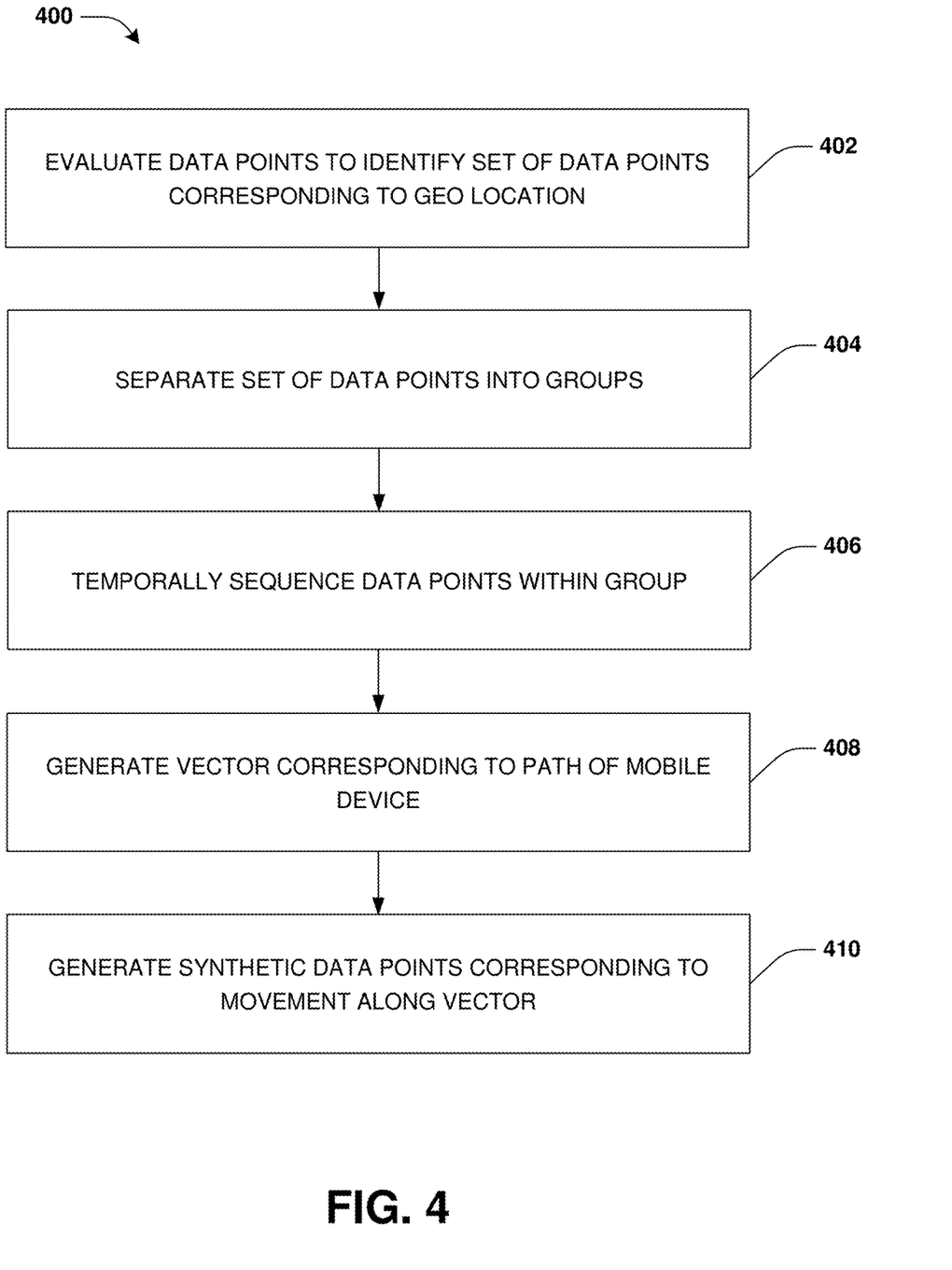
FIG. 4 is a flow chart illustrating an example method for synthetic data point generation.
Figure 5:
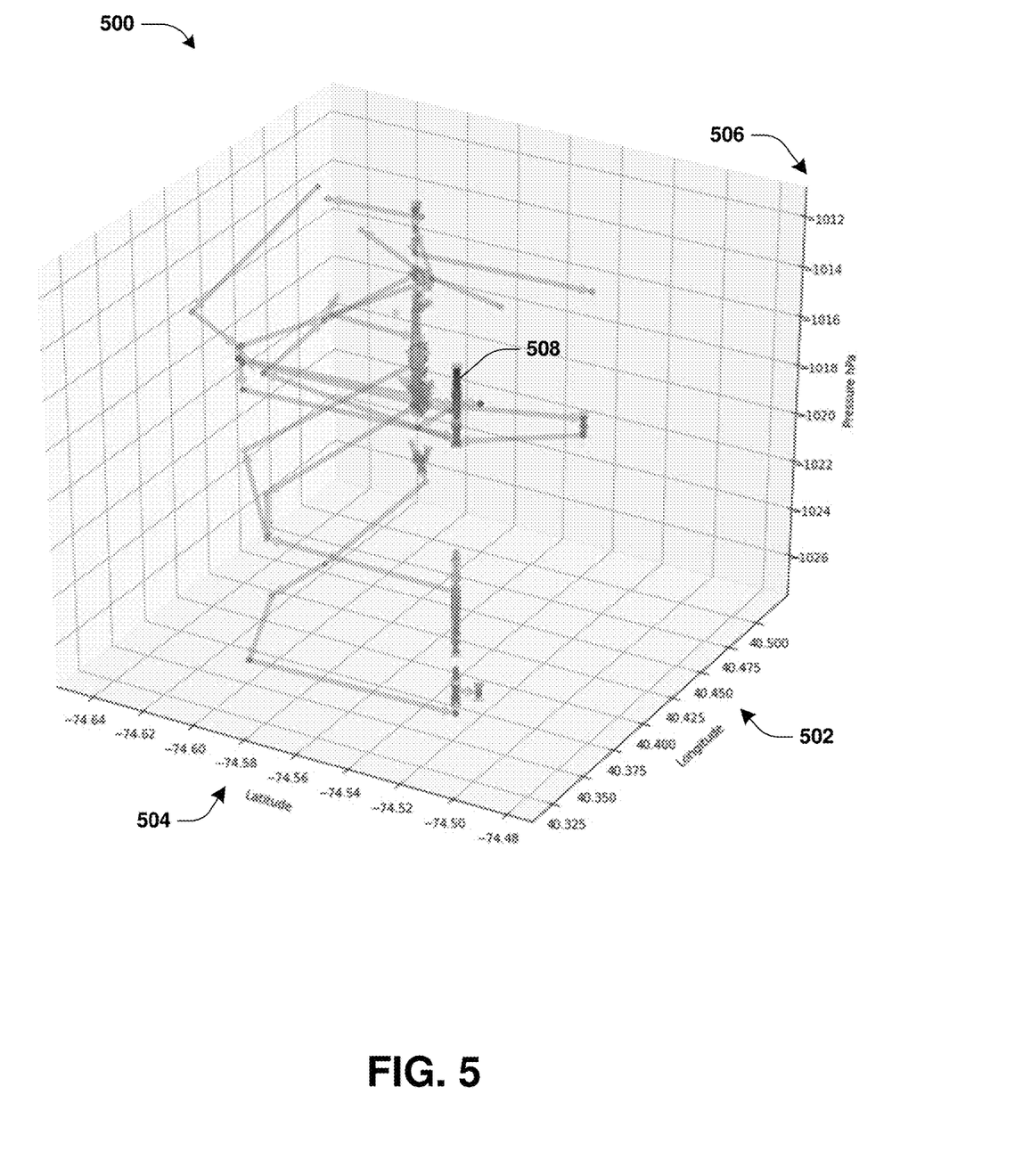
FIG. 5 is an illustration of an example graph illustrating one or more vectors used for synthetic data point generation.
Figure 6:
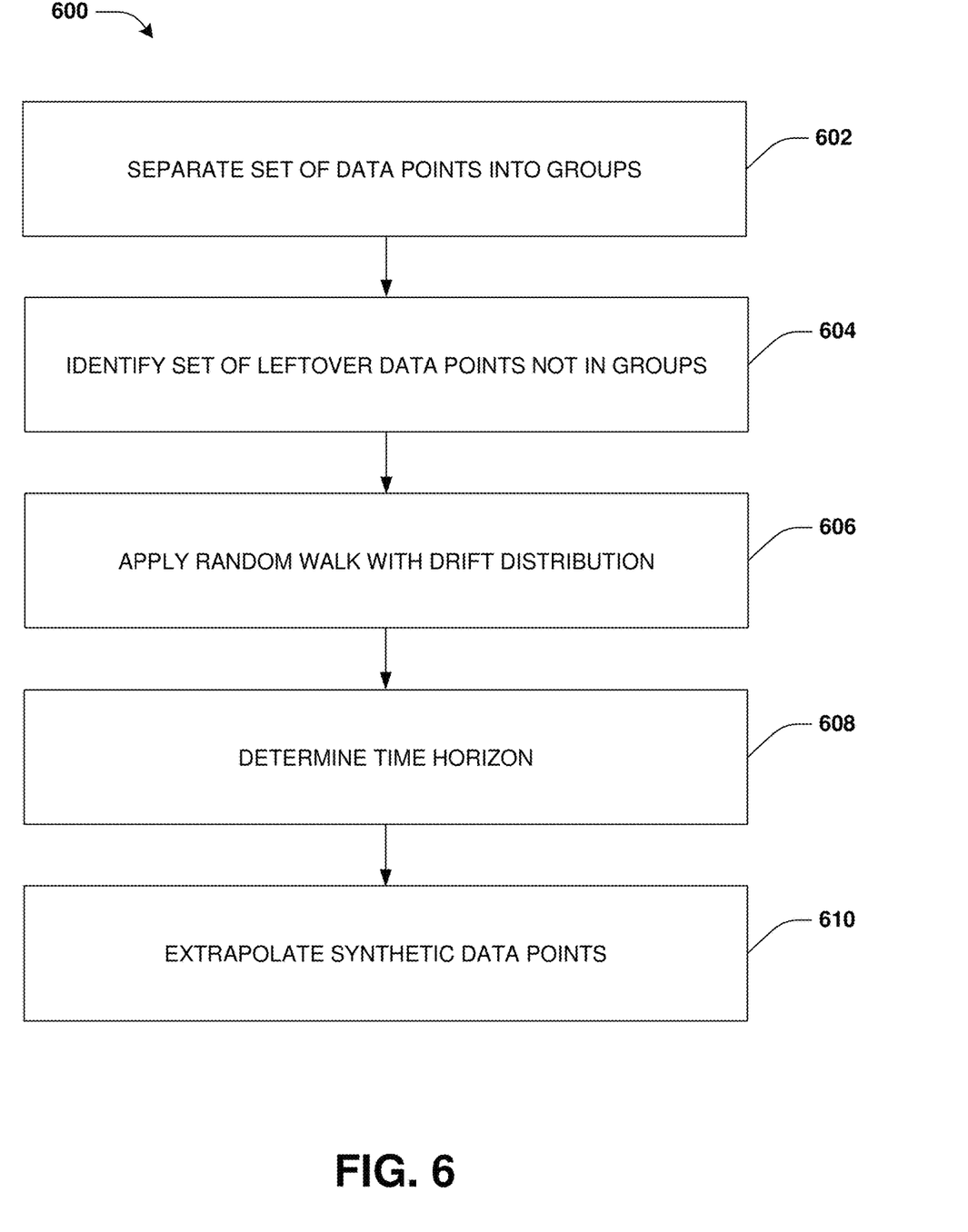
FIG. 6 is a flow chart illustrating an example method for synthetic data point generation.

FIG. 1 illustrates a system 100 that may implement one or more of the methods 200, 400, and 600 of FIGS. 2, 4, and 6, and is described in conjunction with FIGS. 2-7. The system 100 may comprise a data collection device 102 and/or a data point synthesis component 132, as illustrated by FIG. 1. The data collection device 102 and the data point synthesis component 132 may be hosted on separate computing devices or on the same computing device. The data collection device 102 and/or the data point synthesis component 132 may be hosted utilizing a server, a virtual machine, a computing device, hardware, software, or combination thereof.

The data collection device 102 may be configured to collect data points 130 from mobile devices. For example, users of the mobile devices may register with the data collection device 102 in order to provide consent for the data collection device 102 to receive the data points 130 that are collected by the mobile devices and transmitted from the mobile devices to the data collection device 102. The data points 130 may correspond to sensor data collected by the mobile devices using various types of sensors, such as accelerometers, barometers, microphones, cameras, gyroscopes, global positioning system (GPS) units, and/or other types of sensors. In an example, a mobile device may be configured to collect sensor data based upon a triggering event, such as in response to the mobile device experiencing a threshold amount of movement (e.g., movement indicative of a user moving around a building 104 while carrying the mobile device). Accordingly, the mobile device may collect sensor data from an accelerometer, GPS data from a GPS unit, barometric pressure, and/or a variety of other sensor data from sensors of the mobile device. The mobile device may periodically transmit the sensor data as data points to the data collection device 102. The collected data points may be provided to the data point synthesis component 132 that is configured to generate synthetic data points based upon the data points, which will be further described in relation to FIGS. 2-7.

In an example of the data collection device 102 collecting the data points 130 from mobile devices, the data collection device 102 may be configured to collect and identify data points received while mobile devices are within a particular geographic region such as within the building 104. These data points may be utilized by machine learning algorithms such as a clustering algorithm in order to identify a structure of the building 104, such as floor levels and floor heights of the building. A first mobile device 114 and a second mobile device 116 may be located at a first floor 106 of the building 104. Sensors within the first mobile device 114 and the second mobile device 116 may collect sensor data as the first mobile device 114 and the second mobile device 116 move around the building 104. In this way, the first mobile device 114 and the second mobile device 116 may transmit the collected sensor data as the data points 130 to the data collection device 102. A third mobile device 108 may be located at a second floor 108 of the building 104, such as where the third mobile device 108 is currently being carried from the second floor 108 to a third floor 110 of the building. Sensors within the third mobile device 118 may collect sensor data as the third mobile device 118 moves around the building 104. In this way, the third mobile device 118 may transmit the collected sensor data as the data points 130 to the data collection device 102.

A fourth mobile device 120, a fifth mobile device 122, and a sixth mobile device 124 may be located at the third floor 110 of the building 104. Users of the fourth mobile device 120 and the fifth mobile device 122 may be walking around the third floor 110, while a user of the sixth mobile device 124 may be walking up stairs to a fourth floor 112 of the building 104. Sensors within the fourth mobile device 120, the fifth mobile device 122, and the sixth mobile device 124 may collect sensor data as the fourth mobile device 120, the fifth mobile device 122, and the sixth mobile device 124 move around the building 104. In this way, the fourth mobile device 120, the fifth mobile device 122, and the sixth mobile device 124 may transmit the collected sensor data as the data points 130 to the data collection device 102. A seventh mobile device 126 and an eighth mobile device 128 may be located at the fourth floor 112 of the building 104. Sensors within the seventh mobile device 126 and the eighth mobile device 128 may collect sensor data as the seventh mobile device 126 and the eighth mobile device 128 move around the building 104. In this way, the seventh mobile device 126 and the eighth mobile device 128 may transmit the collected sensor data as the data points 130 to the data collection device 102.

Once the data points 130 have been collected by the data collection device 102, the data point synthesis component 132 may process the data points 130 in order to generate additional synthetic data points. As part of generating the synthetic data points, the data point synthesis component 132 may determine an allowable error threshold (e.g., a maximum allowed vertical error corresponding to calculated confidence intervals), which is further described in relation to FIGS. 2 and 3.

FIG. 2 illustrates a method 200 for determining the allowable error threshold. The method 200 may be implemented by the data point synthesis component 132. The data points 130 collected by the data collection device 102 may comprise various information such as location data (e.g., latitude and longitude information), movement data such as acceleration data, barometric pressure data, identifiers (e.g., a session identifier, a user identifier, a mobile device identifier, a unique identifier, etc.), and/or other information. In an example, the data point synthesis component 132 may filter data points that are not indicative of human walking speed. In an example, statistical analysis of average human walking speeds may be compared to the movement data to determine whether data points from a mobile device are indicative of a user walking around the building 104 compared to some other motion such as the user driving in a garage underneath the building 104. In another example, the mobile device may host an API that determines a current type of motion of the mobile device, which may be included in the data points 130 so that the data point synthesis component 132 can filter out data points that are not indicative of human walking speeds. In this way, the data point synthesis component 132 filters out data points that fall outside the bounds of human walking speeds.

The data point synthesis component 132 may cross reference the location data with zoning data to determine a building type of the building 104. For example, the data point synthesis component 132 may determine whether longitude and latitude values of the data points 130 correspond to a commercially zoned area, a residentially zoned area, an industrially zoned area, and/or other zoning information indicative of a building type of the building 104. The zoning data may be utilized by the data point synthesis component 132 to determine an average floor height for buildings corresponding to the building type of the building 104. The average floor height may be used as a center of distribution by the data point synthesis component 132 while calculating bounds for subsequently generating synthetic data points.

During operation 202 of method 200, a confidence level may be determined. The confidence level may be user specified or programmatically determined. The confidence level may correspond to a confidence interval in terms of what percentage of data points to take into consideration. In an example, data points may be centered around an actual floor height, where some of the data points are above and some are below the actual floor height due to noise. The confidence level is used to determine what percentage of those data points to consider for generating synthetic data points. The more data points considered, the more synthetic data points that can be generated but also more noise. Once the confidence level is determined, a model distribution of how the data points are located around a floor level may be generated by the data point synthesis component 132.

During operation 204 of method 200, theoretical bounds are set by the data point synthesis component 132. In an example, the theoretical bounds may be set by the data point synthesis component 132 as values considered to be half of a floor height of the building 104, which may be derived from the zoning information. That is, the zoning information indicates a zoning type of an area where the building is locating. An average floor height for types of buildings within the zoning type of the area may be determined, and thus the theoretical bounds may be determined based upon the average floor height.

During operation 206 of method 200, a maximum variance may be calculated by the data point synthesis component 132 using an inequality theorem, such as a Bhatia-Davis inequality theorem. With the Bhatia-Davis inequality theorem, if certain parameters about the model distribution are known such as an average value, then the Bhatia-Davis inequality theorem can be used to calculate a maximum distribution of data points to utilize from the model distribution based upon the maximum distribution of data points being within the bounds of the maximum variance. In this way, a percentage of data points to take from the model distribution of data points may be determined in order to meet the confidence level. During operation 208 of method 200, confidence intervals may be calculated by the data point synthesis component 132 for the confidence level using a truncated distribution with the theoretical bounds and the maximum variance. Points above or below the bounds would not be considered as corresponding to a current floor level, but would be considered part of a floor level above or below the current floor level. During operation 210 of method 200, the confidence intervals may be used by the data point synthesis component 132 to determine an allowable error threshold that will be subsequently used for generating synthetic data points.

FIG. 3 illustrates a graph 300 corresponding to an example of the model distribution. An x-axis 304 of the graph 300 corresponds to distance of data points with respect to one another. A y-axis 302 of the graph 300 corresponds to probability that the data points belong to the current floor level. Line 306 represents a plot of the data points 130. Area 308 corresponds to confidence intervals for the allowable error threshold (e.g., confidence intervals for a maximum allowed error). The area 308 represents an area between two confidence intervals, representing the maximum allowed area, within which synthetic data points can be generated. In an example, the area 308 may correspond to data points having distances between 2.298 meters and 6.303 meters, which may represent 95% of the data points 130, as an example.

Once the data point synthesis component 132 has determined the allowable error threshold corresponding to the confidence intervals that are used to bound the synthetic data points to being within the confidence intervals and not exceeding the allowable error threshold, the data point synthesis component 132 may generate synthetic data points.

FIG. 4 illustrates a method 400 for determining synthetic data points according to a first data point synthesis generation technique. During operation 402 of method 400, the data points, collected from mobile devices by the data collection device 102, may be evaluated by the data point synthesis component 132 based upon locational data, such as longitude and latitude data, to identify a set of data points as corresponding to a geographical region. For example, the geographical region may correspond to the building 104, and thus the data point synthesis component 132 may identify data points that were collected from mobile devices moving around the building 104, such as the first mobile device 114, the second mobile device 116, the third mobile device 118, the fourth mobile device 120, the fifth mobile device 122, the sixth mobile device 124, the seventh mobile device 126, the eighth mobile device 128, and/or other mobile device while moving around within the building 104. Data points collected by the data collection device 102 from those mobile devices and/or other mobile devices while not within the building 104 (not within the geographical region) are not identified by the data point synthesis component 132 as the set of data points.

During operation 404 of method 400, the data point synthesis component 132 may separate the set of data points, corresponding to the geographical region, into groups. In an example, the data point synthesis component 132 may separate the set of data points into groups based upon sessions, such as a mobile device session of a user interacting with and/or carrying around a mobile device within in the building 104. In an example, the data point synthesis component 132 may separate the set of data points into groups based upon user identifiers associated with users and/or mobile device identifiers of mobile devices. It may be appreciated that any type of identifier or information associated with the set of data points may be utilized to group the set of data points into the groups. In some embodiments, some data points may not be grouped into the groups, which may be identified as a set of leftover data points that may be used by a second data point synthesis generation technique to generate synthetic data points, which will be subsequently described in relation to FIGS. 6 and 7.

During operation 406 of method 400, the data point synthesis component 132 may temporally sequence data points within each group based upon timestamp data. For example, a first group may comprise a first set of data points having the same identifier (e.g., a user identifier, a mobile device session identifier, etc.), and thus the first set of data points may correspond to sensor data collected by the first mobile device 114 of a first user while walking around the building 104. Timestamps of when each data point within the first set of data points was collected by the first mobile device 114 may be used to temporally sequence the data points such that a first ordered data point corresponds to an initial starting position of the first mobile device 114 and a last ordered data point corresponds to a final ending position of the first mobile device 114. A second group may comprise a second set of data points having the same identifier (e.g., a user identifier, a mobile device session identifier, etc.), and thus the second set of data points may correspond to sensor data collected by the second mobile device 116 of a second user while walking around the building 104. Timestamps of when each data point within the second set of data points was collected by the second mobile device 116 may be used to temporally sequence the data points such that a first ordered data point corresponds to an initial starting position of the second mobile device 116 and a last ordered data point corresponds to a final ending position of the second mobile device 116.

During operation 408 of method 400, the data point synthesis component 132 may generate vectors derived from sequences of data points within the groups. For example, a first vector may connect the first set of data points sequentially ordered within the first group based upon time. Thus, the first vector may represent a path of the first mobile device 114 within the building 104 over time. A second vector may connect the second set of data points sequentially ordered within the second group based upon time. Thus, the second vector may represent a path of the second mobile device 116 within the building 104 over time.

FIG. 5 illustrates a graph 500 representing one or more vectors of a mobile device 508 moving within the building 104. The graph 500 comprises an x-axis 504 representing latitude values of data points connected by the one or more vectors. The graph 500 comprises a y-axis 502 representing longitude values of the data points connected by the one or more vectors. The graph 500 comprises a z-axis 506 representing pressure values of data points connected by the one or more vectors. In this way, the graph 500 may represent the one or more vectors of the mobile device 508 moving within the building 104, which is used by the data point synthesis component 132 to generate synthetic data points while moving along the one or more vectors.

During operation 410 of method 400, the data point synthesis component 132 may generate synthetic data points corresponding to movement along the vectors according to fixed value steps. In an example, the fixed value steps may correspond to an average human step length. In an example of generating synthetic data points, the data point synthesis component 132 may start at a first ordered data point of a vector, and move along the vector until reaching a last ordered data point of the vector. While moving along the vector, the data point synthesis component 132 may generate synthetic data points along the vector that do not correspond to actual data points along the vector. In this way, the synthetic data points are created as additional data points that are in addition to the actual data points from the mobile devices. A slope may be determined for the vector between a starting data point (a first ordered data point) and an ending data point (a last ordered data point). The slope may correspond to height values of the data points along the vector. Barometric pressure for the synthetic data points along the vector may be adjusted based upon the slope.

In some embodiments, the synthetic data points may be combined with the data points (e.g., the actual measured data points from mobile devices) to generate a training set of data points. Combining the synthetic data points with the data points to generate the training set of data points alleviates any sparsity issues of the data points. The training set of data points may be used to train a machine learning algorithm, such as a clustering algorithm. In an example, the machine learning algorithm may be trained to determine floor heights of floors within the building 104. The accuracy of the machine learning algorithm is improved because the training set of data points comprises more data points than just the actual measured data points from the mobile devices because the training set of data points additional includes the synthetic data points.

In some embodiments, additional synthetic data points, for inclusion within the training set of data points, may be generated using the second data point synthesis generation technique of method 600 of FIG. 6. During operation 602 of method 600, the data point synthesis component 132 may separate the set of data points into groups, which corresponds to operation 404 of method 400. During operation 604 of method 600, the data point synthesis component 132 may identify a set of leftover data points not within the groups that were used to generate the synthetic data points using the first data point synthesis generation technique of method 400.

During operation 606 of method 600, the data point synthesis component 132 may apply a random walk with drift distribution to the set of leftover data points to generate confidence bounds (confidence bands). The random walk with drift distribution is a probability distribution of possible synthetic points that can be extended from a known data point given a fixed movement length, such as the average human step length. For example, the probability distribution may correspond to set limits on a total distance from a starting point given an average human walking speed. The random walk with drift distribution may utilize velocity information, derived from accelerometer data of mobile devices, as drift values for horizontal movement. The random walk with drift distribution may utilize a constant, derived from ascending and descending speed in buildings (e.g., an average speed of humans ascending and descending in buildings have a same or similar building type as the building 104), as vertical movement.

The random walk with drift distribution may generate time horizons for how far synthetic data can be generated before exceeding confidences bounds (confidence intervals) set for the allowable error threshold (e.g., the allowable error threshold determined by operation 210 of method 200). In an example, a time horizon is a line representing that, with certain probability, what can be known in terms of vertical elevation given a starting leftover data point over a certain period of time. There is a maximum amount of vertical deviation that could occur from the starting leftover data point given an average speed of motion. The allowable error threshold (a maximum allowed error) is utilized in order to determine what maximum height deviation is allowed from a floor height while satisfying the requirements for the confidence intervals (e.g., for a 95% confidence level, there is a certain number of seconds of motion from the starting leftover data point that is possible before vertical motion can go above/beyond the confidence bounds set for that allowable error threshold). In this way, a time horizon may be determined by the data point synthesis component 132 for how far synthetic data can be generated before exceeding the confidence bounds set for the allowable error threshold, during operation 608 of FIG. 6.

Figure 7:
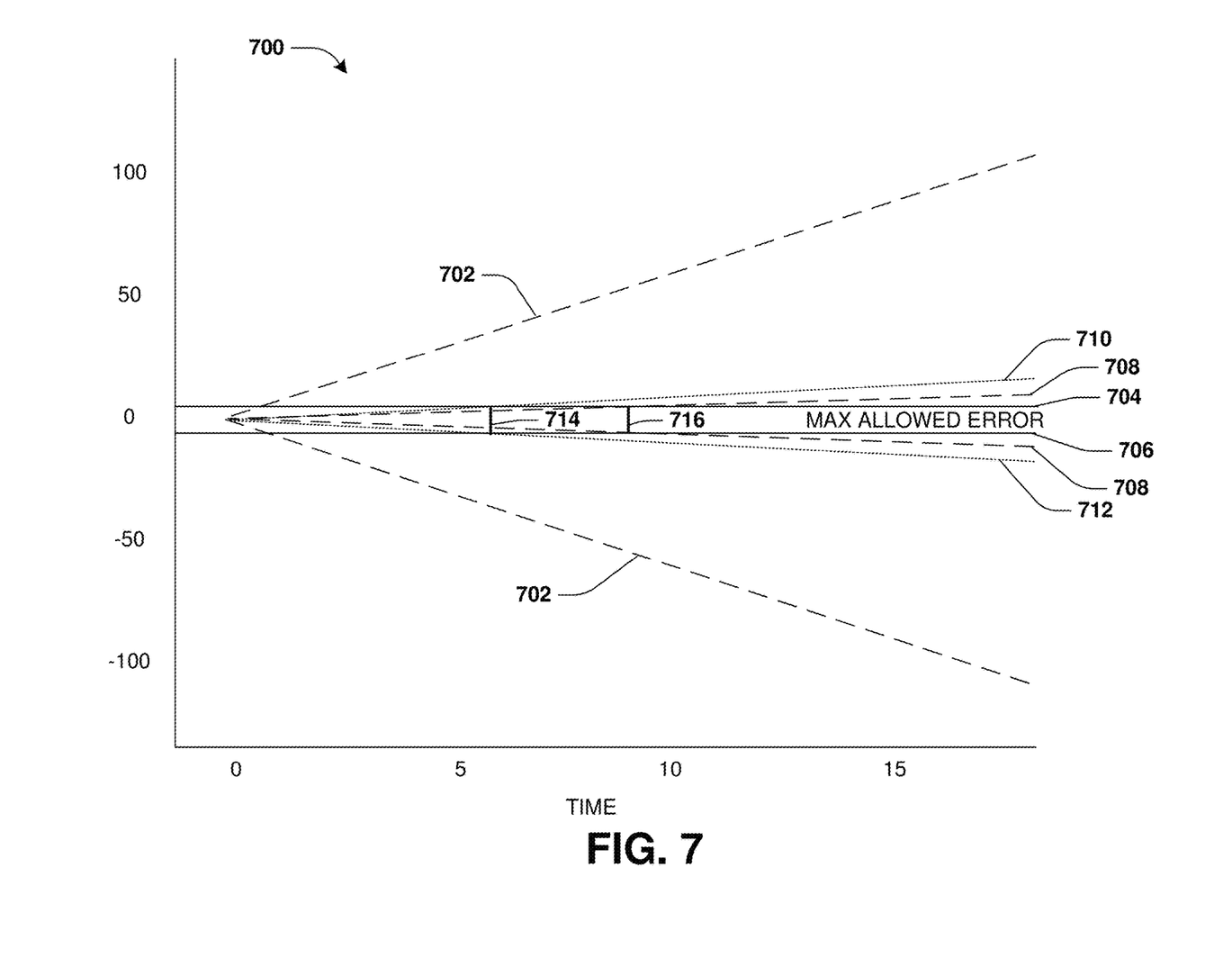
FIG. 7 is an illustration of an example graph illustrating time horizons used for synthetic data point generation.

FIG. 7 illustrates a graph 700 of time horizons. An upper confidence bound 704 and a lower confidence bound 706 may define the allowable error threshold (a maximum allowed error). In an example, time horizon 702 corresponds to 100% confidence, time horizon 712 corresponds to 95% confidence, and time horizon 708 corresponds to 80% confidence. Intersection 714 of the time horizon 710 and the upper confidence bound 704 and the lower confidence bound 706 and intersection 716 of the time horizon 708 and the upper confidence bound 704 and the lower confidence bound 706 correspond to time lines for extrapolating additional synthetic data points.

During operation 610 of method 600, additional synthetic data points may be extrapolated by the data point synthesis component 132 along vectors that are calculated based upon the time horizon, a current direction derived from accelerometer data, and velocity information. In an example, the data point synthesis component 132 may extrapolate the additional synthetic data points starting at a leftover data point of a vector, and moving along the vector within the time horizon according to fixed value steps corresponding to average human stride length. Barometric pressure of the leftover data point may be assigned to the additional synthetic data points generated while moving along the vector from the leftover data point. In this way, additional synthetic data points may be generated from the leftover data points for inclusion within the training set of data points.

In an embodiment of generating synthetic data points, error bounds may be determined for generating synthetic data points from a set of data points collected from mobile devices. Paths associated with groups of data points of the set of data points may be determined. Error bounds may be applied to limit the paths to generate limited path data. The synthetic data points may be generated based upon the limited path data by traversing the paths according the limits set by the error bounds. In an example, additional synthetic data points are generated by applying a random walk with drift distribution and the error bounds to individual data points not within the groups of data points.

According to some embodiments, a method is provided. The method includes evaluating data points, collected from mobile devices, based upon locational data to identify a set of data points corresponding to a geographical region; separating the set of data points into groups based upon at least one of mobile device sessions or user identifiers associated with the mobile devices; temporally sequencing data points within a group based upon timestamp data; generating a vector, derived from a sequence of data points within the group, corresponding to a path of a mobile device within the geographical region; and generating synthetic data points corresponding to movement along the vector according to fixed value steps.

According to some embodiments, the method includes calculating a slope along the vector between a starting data point and an ending data point; and adjusting barometric pressure for the synthetic data points based the slope.

According to some embodiments, the method includes generating a set of synthetic data points for the groups based upon vectors derived from sequences of data points within the groups, wherein the set of synthetic data points comprises the synthetic data points.

According to some embodiments, the method includes combining the set of data points and the set of synthetic data points into a training set of data points; and training a clustering algorithm using the training set of data points.

According to some embodiments, the method includes training the clustering algorithm to determine floor heights for floors within a building corresponding to the geographical region.

According to some embodiments, the method includes identifying a set of leftover data points not within the groups used to generate the set of synthetic data points; applying a random walk with drift distribution to the set of leftover data points to generate confidence bounds.

According to some embodiments, the method includes utilizing velocity information, derived from accelerometer data of the mobile device, as a drift value for horizontal movement.

According to some embodiments, the method includes utilizing a constant, derived from ascending and descending speed, for vertical movement.

According to some embodiments, the method includes determining a time horizon for how far synthetic data can be generated before exceeding the confidence bounds set for an allowable error threshold.

According to some embodiments, the method includes calculating a second vector utilizing the time horizon, a current direction derived from accelerometer data, and velocity information.

According to some embodiments, the method includes extrapolating additional synthetic data points starting at a leftover data point of the second vector and moving along the second vector within the time horizon according to the fixed value steps.

According to some embodiments, the method includes assigning a barometric pressure of the leftover data point to the additional synthetic data points.

According to some embodiments, the method includes determining a confidence level; setting theoretical bounds on values considered to be half of a floor height of a building associated with the geographical region, wherein the values are derived from zoning information associated with the geographical region; calculating a maximum variance utilizing an inequality theorem; calculating confidence intervals for the confidence level utilizing a truncated distribution with the theoretical bounds and the maximum variance; and determining the allowable error threshold based upon the confidence intervals.

According to some embodiments, a system is provided. The system comprises a processor coupled to memory, the processor configured to execute instructions to perform operations. The operations include separating a set of data points, collected from mobile devices, into groups based upon at least one of mobile device sessions or user identifiers associated with the mobile devices; identifying a set of leftover data points not within the groups; applying a random walk with drift distribution to the set of leftover data points to generate confidence bounds; determining a time horizon for how far synthetic data can be generated before exceeding the confidence bounds set for an allowable error threshold; and extrapolating synthetic data points starting at a leftover data point of a vector of the time horizon and moving along the vector according to fixed value steps.

According to some embodiments, the operations include determining additional synthetic data points based upon vectors created for data points within the groups.

According to some embodiments, the operations include calculating the vector utilizing the time horizon, a current direction derived from accelerometer data, and velocity information.

According to some embodiments, the operations include determining a confidence level; setting theoretical bounds on values considered to be half of a floor height of a building associated with a geographical region from which the data points were collected, wherein the values are derived from zoning information associated with the geographical region; calculating a maximum variance utilizing an inequality theorem; calculating confidence intervals for the confidence level utilizing a truncated distribution with the theoretical bounds and the maximum variance; and determining the allowable error threshold based upon the confidence intervals According to some embodiments, the inequality theorem is a Bhatia-Davis inequality.

According to some embodiments, a non-transitory computer-readable medium storing instructions that when executed facilitate performance of operations, is provided. The operations include determining error bounds for generating synthetic data points from a set of data points collected from mobile devices; determining paths associated with groups of data points of the set of data points; applying the error bounds to limit the paths to generate limited path data; and generating the synthetic data points based upon the limited path data.

According to some embodiments, the operations include applying a random walk with drift distribution and the error bounds to individual data points not within the groups of data points to generate additional synthetic data points.

Figure 8:
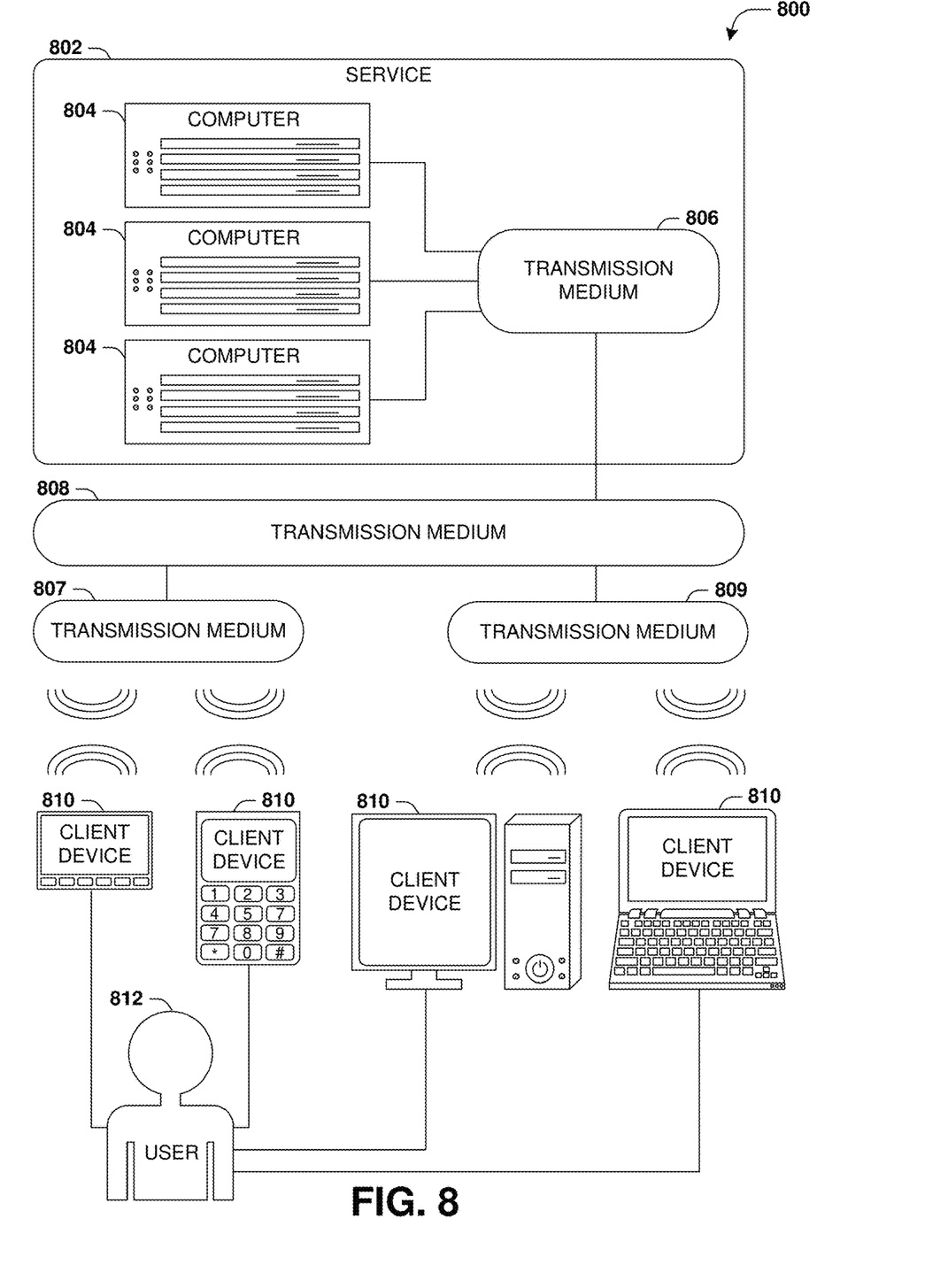
FIG. 8 is an illustration of example networks that may utilize and/or implement at least a portion of the techniques presented herein.

FIG. 8 is an interaction diagram of a scenario 800 illustrating a service 802 provided by a set of computers 804 to a set of client devices 810 via various types of transmission mediums. The computers 804 and/or client devices 810 may be capable of transmitting, receiving, processing, and/or storing many types of signals, such as in memory as physical memory states.

The computers 804 of the service 802 may be communicatively coupled together, such as for exchange of communications using a transmission medium 806. The transmission medium 806 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 802.

Likewise, the transmission medium 806 may comprise one or more sub-networks, such as may employ different architectures, may be compliant or compatible with differing protocols and/or may interoperate within the transmission medium 806. Additionally, various types of transmission medium 806 may be interconnected (e.g., a router may provide a link between otherwise separate and independent transmission medium 806).

In scenario 800 of FIG. 8, the transmission medium 806 of the service 802 is connected to a transmission medium 808 that allows the service 802 to exchange data with other services 802 and/or client devices 810. The transmission medium 808 may encompass various combinations of devices with varying levels of distribution and exposure, such as a public wide-area network and/or a private network (e.g., a virtual private network (VPN) of a distributed enterprise).

In the scenario 800 of FIG. 8, the service 802 may be accessed via the transmission medium 808 by a user 812 of one or more client devices 810, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 810 may communicate with the service 802 via various communicative couplings to the transmission medium 808. As a first such example, one or more client devices 810 may comprise a cellular communicator and may communicate with the service 802 by connecting to the transmission medium 808 via a transmission medium 807 provided by a cellular provider. As a second such example, one or more client devices 810 may communicate with the service 802 by connecting to the transmission medium 808 via a transmission medium 809 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the computers 804 and the client devices 810 may communicate over various types of transmission mediums.

Figure 9:
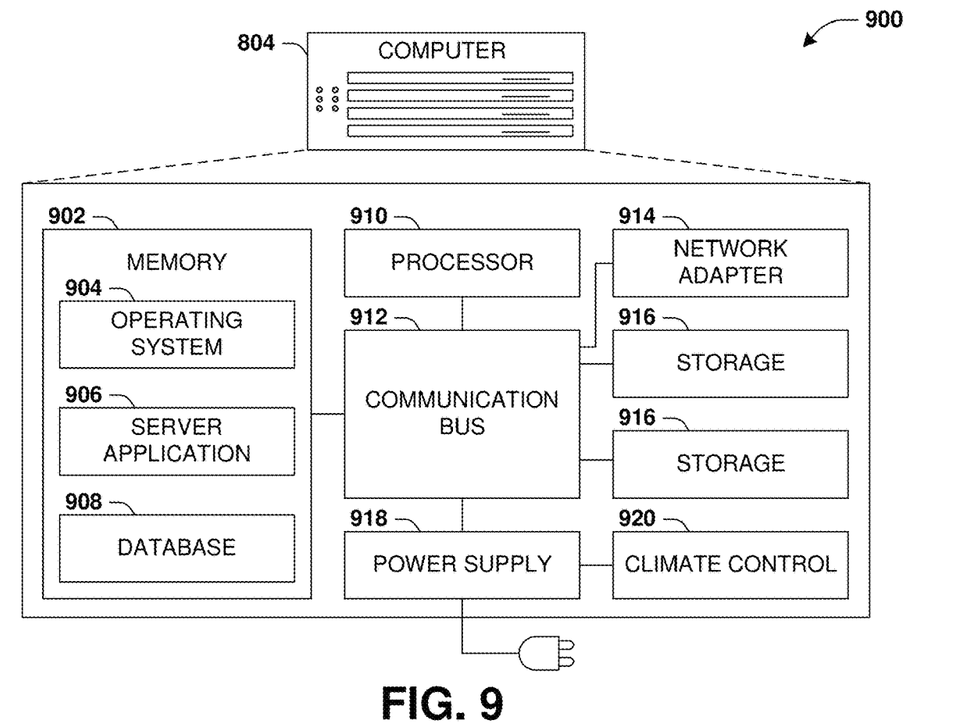
FIG. 9 is an illustration of a scenario involving an example configuration of a computer that may utilize and/or implement at least a portion of the techniques presented herein.

FIG. 9 presents a schematic architecture diagram 900 of a computer 804 that may utilize at least a portion of the techniques provided herein. Such a computer 804 may vary widely in configuration or capabilities, alone or in conjunction with other computers, in order to provide a service such as the service 802.

The computer 804 may comprise one or more processors 910 that process instructions. The one or more processors 910 may optionally include a plurality of cores; one or more coprocessors, such as a mathematics coprocessor or an integrated graphical processing unit (GPU); and/or one or more layers of local cache memory. The computer 804 may comprise memory 902 storing various forms of applications, such as an operating system 904; one or more computer applications 906; and/or various forms of data, such as a database 908 or a file system. The computer 804 may comprise a variety of peripheral components, such as a wired and/or wireless network adapter 914 connectible to a local area network and/or wide area network; one or more storage components 916, such as a hard disk drive, a solid-state storage device (SSD), a flash memory device, and/or a magnetic and/or optical disk reader.

The computer 804 may comprise a mainboard featuring one or more communication buses 912 that interconnect the processor 910, the memory 902, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 912 may interconnect the computer 804 with at least one other computer. Other components that may optionally be included with the computer 804 (though not shown in the schematic architecture diagram 900 of FIG. 9) include a display; a display adapter, such as a graphical processing unit (GPU); input peripherals, such as a keyboard and/or mouse; and a flash memory device that may store a basic input/output system (BIOS) routine that facilitates booting the computer 804 to a state of readiness.

The computer 804 may operate in various physical enclosures, such as a desktop or tower, and/or may be integrated with a display as an "all-in-one" device. The computer 804 may be mounted horizontally and/or in a cabinet or rack, and/or may simply comprise an interconnected set of components. The computer 804 may comprise a dedicated and/or shared power supply 918 that supplies and/or regulates power for the other components. The computer 804 may provide power to and/or receive power from another computer and/or other devices. The computer 804 may comprise a shared and/or dedicated climate control unit 920 that regulates climate properties, such as temperature, humidity, and/or airflow. Many such computers 804 may be configured and/or adapted to utilize at least a portion of the techniques presented herein.

Figure 10:
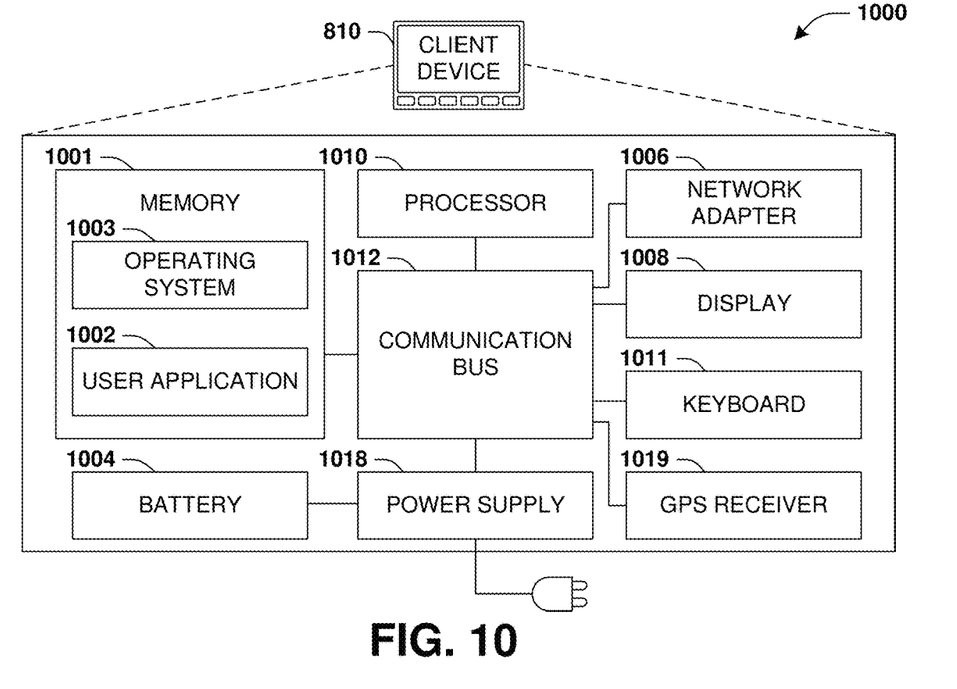
FIG. 10 is an illustration of a scenario involving an example configuration of a client that may utilize and/or implement at least a portion of the techniques presented herein.

FIG. 10 presents a schematic architecture diagram 1000 of a client device 810 whereupon at least a portion of the techniques presented herein may be implemented. Such a client device 810 may vary widely in configuration or capabilities, in order to provide a variety of functionality to a user such as the user 812. The client device 810 may be provided in a variety of form factors, such as a desktop or tower workstation; an "all-in-one" device integrated with a display 1008; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 810 may serve the user in a variety of roles, such as a workstation, kiosk, media player, gaming device, and/or appliance.

The client device 810 may comprise one or more processors 1010 that process instructions. The one or more processors 1010 may optionally include a plurality of cores; one or more coprocessors, such as a mathematics coprocessor or an integrated graphical processing unit (GPU); and/or one or more layers of local cache memory. The client device 810 may comprise memory 1001 storing various forms of applications, such as an operating system 1003; one or more user applications 1002, such as document applications, media applications, file and/or data access applications, communication applications such as web browsers and/or email clients, utilities, and/or games; and/or drivers for various peripherals. The client device 810 may comprise a variety of peripheral components, such as a wired and/or wireless network adapter 1006 connectible to a local area network and/or wide area network; one or more output components, such as a display 1008 coupled with a display adapter (optionally including a graphical processing unit (GPU)), a sound adapter coupled with a speaker, and/or a printer; input devices for receiving input from the user, such as a keyboard 1011, a mouse, a microphone, a camera, and/or a touch-sensitive component of the display 1008; and/or environmental sensors, such as a global positioning system (GPS) receiver 1019 that detects the location, velocity, and/or acceleration of the client device 810, a compass, accelerometer, and/or gyroscope that detects a physical orientation of the client device 810. Other components that may optionally be included with the client device 810 (though not shown in the schematic architecture diagram 1000 of FIG. 10) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 810 to a state of readiness; and a climate control unit that regulates climate properties, such as temperature, humidity, and airflow.

The client device 810 may comprise a mainboard featuring one or more communication buses 1012 that interconnect the processor 1010, the memory 1001, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 810 may comprise a dedicated and/or shared power supply 1018 that supplies and/or regulates power for other components, and/or a battery 1004 that stores power for use while the client device 810 is not connected to a power source via the power supply 1018. The client device 810 may provide power to and/or receive power from other client devices.

Figure 11:
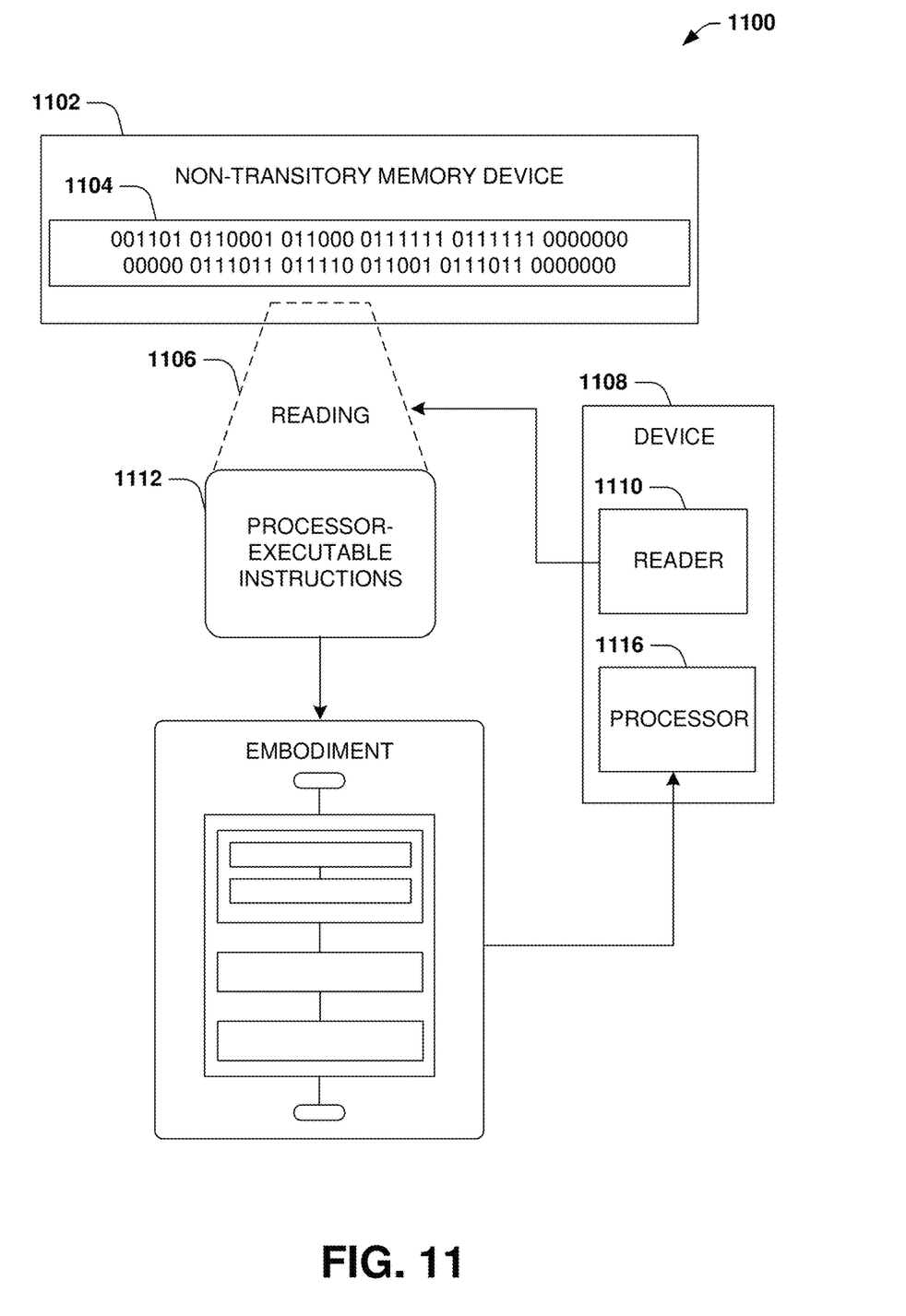
FIG. 11 is an illustration of a scenario featuring an example non-transitory machine readable medium in accordance with one or more of the provisions set forth herein.

FIG. 11 is an illustration of a scenario 1100 involving an example non-transitory machine readable medium 1102. The non-transitory machine readable medium 1102 may comprise processor-executable instructions 1112 that when executed by a processor 1116 cause performance (e.g., by the processor 1116) of at least some of the provisions herein. The non-transitory machine readable medium 1102 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 1102 stores computer-readable data 1104 that, when subjected to reading 1106 by a reader 1110 of a device 1108 (e.g., a read head of a hard disk drive, or a read operation invoked on a solid-state storage device), express the processor-executable instructions 1112. In some embodiments, the processor-executable instructions 1112, when executed cause performance of operations, such as at least some of the example method 200 of FIG. 2, at least some of the example method 400 of FIG. 4, and/or at least some of example method 600 of FIG. 6, for example. In some embodiments, the processor-executable instructions 1112 are configured to cause implementation of a system, such as at least some of the example system 100 of FIG. 1, for example.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

What is claimed is:

1. A method comprising:
   evaluating data points, collected from mobile devices, based upon locational data to identify a set of data points corresponding to a geographical region;
   separating the set of data points into groups based upon at least one of mobile device sessions or user identifiers associated with the mobile devices;
   temporally sequencing data points within a group based upon timestamp data;
   generating a vector, derived from a sequence of data points within the group, corresponding to a path of a mobile device within the geographical region;
   generating synthetic data points corresponding to movement along the vector according to fixed value steps;
   combining the set of data points and the synthetic data points into a training set of data points; and
   training a clustering algorithm using the training set of data points.

2. The method of claim 1, comprising:
   calculating a slope along the vector between a starting data point and an ending data point; and
   adjusting barometric pressure for the synthetic data points based the slope.

3. The method of claim 1, comprising:
   generating a set of synthetic data points for the groups based upon vectors derived from sequences of data points within the groups, wherein the set of synthetic data points comprises the synthetic data points.

4. The method of claim 1, wherein the training comprises:
   training the clustering algorithm to determine floor heights for floors within a building corresponding to the geographical region.

5. A method comprising:
   evaluating data points, collected from mobile devices, based upon locational data to identify a set of data points corresponding to a geographical region;
   separating the set of data points into groups based upon at least one of mobile device sessions or user identifiers associated with the mobile devices;
   temporally sequencing data points within a group based upon timestamp data;
   generating a vector, derived from a sequence of data points within the group, corresponding to a path of a mobile device within the geographical region;
   generating synthetic data points corresponding to movement along the vector according to fixed value steps;
   identifying a set of leftover data points not within the groups; and
   applying a random walk with drift distribution to the set of leftover data points to generate confidence bounds.

6. The method of claim 5, wherein the applying the random walk with drift distribution comprises:
   utilizing velocity information, derived from accelerometer data of the mobile device, as a drift value for horizontal movement.

7. The method of claim 5, wherein the applying the random walk with drift distribution comprises:

utilizing a constant, derived from ascending and descending speed, for vertical movement.

8. The method of claim 5, comprising:
determining a time horizon for how far synthetic data can be generated before exceeding the confidence bounds set for an allowable error threshold.

9. The method of claim 8, comprising:
calculating a second vector utilizing the time horizon, a current direction derived from accelerometer data, and velocity information.

10. The method of claim 9, comprising:
extrapolating additional synthetic data points starting at a leftover data point of the second vector and moving along the second vector within the time horizon according to the fixed value steps.

11. The method of claim 10, comprising:
assigning a barometric pressure of the leftover data point to the additional synthetic data points.

12. The method of claim 8, comprising:
determining a confidence level;
setting theoretical bounds on values considered to be half of a floor height of a building associated with the geographical region, wherein the values are derived from zoning information associated with the geographical region;
calculating a maximum variance utilizing an inequality theorem;
calculating confidence intervals for the confidence level utilizing a truncated distribution with the theoretical bounds and the maximum variance; and
determining the allowable error threshold based upon the confidence intervals.

13. A system comprising:
a memory comprising instructions; and
a processor coupled to the memory, the processor configured to execute the instructions to facilitate performance of operations comprising:
separating a set of data points, collected from mobile devices, into groups based upon at least one of mobile device sessions or user identifiers associated with the mobile devices;
identifying a set of leftover data points not within the groups;
applying a random walk with drift distribution to the set of leftover data points to generate confidence bounds;
determining a time horizon for how far synthetic data can be generated before exceeding the confidence bounds set for an allowable error threshold; and
extrapolating synthetic data points starting at a leftover data point of a vector of the time horizon and moving along the vector according to fixed value steps.

14. The system of claim 13, wherein the operations comprise:
determining additional synthetic data points based upon vectors created for data points within the groups.

15. The system of claim 13, wherein the operations comprise:
calculating the vector utilizing the time horizon, a current direction derived from accelerometer data, and velocity information.

16. The system of claim 14, wherein the operations comprise:
determining a confidence level;
setting theoretical bounds on values considered to be half of a floor height of a building associated with a geographical region from which the data points were collected, wherein the values are derived from zoning information associated with the geographical region;
calculating a maximum variance utilizing an inequality theorem;
calculating confidence intervals for the confidence level utilizing a truncated distribution with the theoretical bounds and the maximum variance; and
determining the allowable error threshold based upon the confidence intervals.

17. The system of claim 16, wherein the inequality theorem is a Bhatia-Davis inequality.

18. A non-transitory computer-readable medium storing instructions that when executed facilitate performance of operations comprising:
determining error bounds for generating synthetic data points from a set of data points collected from mobile devices;
determining paths associated with groups of data points of the set of data points;
applying the error bounds to limit the paths to generate limited path data;
generating the synthetic data points based upon the limited path data; and
applying a random walk with drift distribution and the error bounds to individual data points not within the groups of data points to generate additional synthetic data points.

19. The non-transitory computer-readable medium of claim 18, wherein the synthetic data points correspond to movement.

20. A method comprising:
evaluating data points, collected from mobile devices, based upon locational data to identify a set of data points corresponding to a geographical region;
separating the set of data points into groups based upon at least one of mobile device sessions or user identifiers associated with the mobile devices;
temporally sequencing data points within a group based upon timestamp data;
generating a vector, derived from a sequence of data points within the group, corresponding to a path of a mobile device within the geographical region;
generating synthetic data points corresponding to movement along the vector according to fixed value steps;
calculating a slope along the vector between a starting data point and an ending data point; and
adjusting barometric pressure for the synthetic data points based the slope.

* * * * *